(12) United States Patent
Shin et al.

(10) Patent No.: US 12,456,723 B2
(45) Date of Patent: Oct. 28, 2025

(54) ELECTRODE FOR SECONDARY BATTERY AND LITHIUM SECONDARY BATTERY INCLUDING THE SAME

(71) Applicant: SK ON CO., LTD., Seoul (KR)

(72) Inventors: Jae Sik Shin, Daejeon (KR); Kyung Hee Jeong, Daejeon (KR)

(73) Assignee: SK ON CO., LTD., Seoul (KR)

( * ) Notice: Subject to any disclaimer, the term of this patent is extended or adjusted under 35 U.S.C. 154(b) by 771 days.

(21) Appl. No.: 17/711,751

(22) Filed: Apr. 1, 2022

(65) Prior Publication Data

US 2022/0336797 A1    Oct. 20, 2022

(30) Foreign Application Priority Data

Apr. 8, 2021 (KR) .................. 10-2021-0046043
Apr. 8, 2021 (KR) .................. 10-2021-0046056

(51) Int. Cl.
*H01M 4/36* (2006.01)
*C09D 7/40* (2018.01)
(Continued)

(52) U.S. Cl.
CPC .............. *H01M 4/366* (2013.01); *C09D 7/61* (2018.01); *C09D 7/70* (2018.01); *C09D 179/08* (2013.01);
(Continued)

(58) Field of Classification Search
CPC .......... C09D 7/00; C09D 7/001; C09D 7/002; C09D 7/004; C09D 7/005; C09D 7/007; C09D 7/008; C09D 7/02; C09D 7/06; C09D 7/12; C09D 7/1216; C09D 7/1225; C09D 7/1233; C09D 7/125; C09D 7/1266; C09D 7/1275; C09D 7/1283; C09D 7/1291; C09D 7/14; C09D 7/20; C09D 7/40; C09D 7/41; C09D 7/42; C09D 7/43; C09D 7/44; C09D 7/45; C09D 7/46; C09D 7/47; C09D 7/48; C09D 7/60; C09D 7/61; C09D 7/62; C09D 7/63; C09D 7/65; C09D 7/66; C09D 7/67;
(Continued)

(56) References Cited

U.S. PATENT DOCUMENTS 6,187,478 B1 *  2/2001  Clough ............... H01M 50/414
                                                      429/247
2006/0286444 A1 * 12/2006 Nishino ............ H01M 50/489
                                                    429/231.95
(Continued)

FOREIGN PATENT DOCUMENTS

KR         10-1447565 B1      10/2014
KR      10-2015-0057481 A      5/2015
(Continued)

*Primary Examiner* — Niki Bakhtiari
*Assistant Examiner* — Ryan K. Blackwell-Rudasill
(74) *Attorney, Agent, or Firm* — IP & T GROUP LLP (57) ABSTRACT

An electrode for a secondary battery according to exemplary embodiments includes an electrode current collector; an electrode active material layer formed on the electrode current collector; and a coating layer formed on the electrode active material layer and including rod-shaped inorganic particles and spherical organic particles, wherein a ratio of a length of major axis of the rod-shaped inorganic particle to a length of diameter of the spherical organic particle may be 3 to 5.

23 Claims, 2 Drawing Sheets

(51) Int. Cl.
    *C09D 7/61*     (2018.01)
    *C09D 179/08*     (2006.01)
    *H01M 4/02*     (2006.01)
    *H01M 4/13*     (2010.01)
    *H01M 4/62*     (2006.01)
    *H01M 10/0525*     (2010.01)
    *H01M 50/586*     (2021.01)

(52) U.S. Cl.
    CPC ............. *H01M 4/13* (2013.01); *H01M 4/622* (2013.01); *H01M 4/628* (2013.01); *H01M 10/0525* (2013.01); *H01M 50/586* (2021.01); *H01M 2004/021* (2013.01)

(58) Field of Classification Search
    CPC ... C09D 7/68; C09D 7/69; C09D 7/70; C09D 7/71; C09D 7/80; H01M 2004/021; H01M 2004/022; H01M 2004/023; H01M 2004/024; H01M 2004/025; H01M 2004/027; H01M 2004/028; H01M 2004/029; H01M 2004/8684; H01M 2004/8689; H01M 2004/8694; H01M 50/586

See application file for complete search history.

(56) References Cited

U.S. PATENT DOCUMENTS

| | | | |
|---|---|---|---|
| 2010/0248041 | A1* | 9/2010 | Kikuchi .............. H01M 4/0471 |
| | | | 429/223 |
| 2014/0322600 | A1* | 10/2014 | Morita ................ H01M 50/581 |
| | | | 429/212 |
| 2015/0333308 | A1* | 11/2015 | Toyoda ............. H01M 10/0525 |
| | | | 429/144 |
| 2017/0331094 | A1* | 11/2017 | Lee .................... H01M 10/0525 |
| 2018/0294457 | A1* | 10/2018 | Torita .................... H01M 50/44 |
| 2018/0315970 | A1* | 11/2018 | Terashima ........... H01M 50/417 |

FOREIGN PATENT DOCUMENTS

| | | |
|---|---|---|
| KR | 10-2019-0042576 A | 4/2019 |
| KR | 10-1985758 B1 | 6/2019 |
| KR | 10-2096411 B1 | 4/2020 |

* cited by examiner

ELECTRODE FOR SECONDARY BATTERY AND LITHIUM SECONDARY BATTERY INCLUDING THE SAME

CROSS-REFERENCE TO RELATED APPLICATION(S)

This application claims benefit of priority to Korean Patent Application No. 10-2021-0046043 filed on Apr. 8, 2021 and No. 10-2021-0046056 filed on Apr. 8, 2021 in the Korean Intellectual Property Office, the disclosure of which is incorporated herein by reference in its entirety.

BACKGROUND OF THE INVENTION

1. Field of the Invention

The present invention relates to an electrode for a secondary battery and a lithium secondary battery including the same, and more specifically, to an electrode for a secondary battery which includes an insulation layer and a lithium secondary battery including the same.

2. Description of the Related Art

A secondary battery is a battery which can be repeatedly charged and discharged, and has been widely applied to portable electronic devices such as a mobile phone, a laptop computer, etc. as a power source thereof.

For example, the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include an electrode assembly including a cathode, an anode, and a separation membrane interposed between the cathode and the anode. In addition, the lithium secondary battery may include the electrode assembly and a case (e.g., cylindrical, square, and pouch-type case) including an electrolyte in which the electrode assembly is impregnated.

For example, the separation membrane should have insulation properties and ion permeability to allow the electrolyte to smoothly pass therethrough while electrically insulating the cathode and the anode from each other. In addition, as high-energy density lithium secondary batteries have recently been developed, requirements for a separation membrane having improved high temperature stability are increased.

However, a polyolefin microporous membrane commonly used as a substrate for the separation membrane has a problem of causing a deterioration in heat resistance, for example, the membrane is melted at a high temperature.

In order to solve the above-described problem, for example, Korean Patent Registration No. 10-1447565 discloses a separation membrane in which a polyolefin substrate is coated with inorganic particles.

PRIOR ART DOCUMENT

Patent Document

Korean Patent Registration No. 10-1447565

SUMMARY OF THE INVENTION

It is an object of the present invention to provide a secondary battery including a separation membrane having excellent ion permeability and high temperature stability.

Another object of the present invention is to provide a secondary battery having excellent energy density, which includes the separation membrane.

To achieve the above objects, according to an aspect of the present invention, there is provided an electrode for a secondary battery including: an electrode current collector; an electrode active material layer formed on the electrode current collector; and a coating layer formed on the electrode active material layer, and including rod-shaped inorganic particles and spherical organic particles, wherein a ratio of a length of major axis of the rod-shaped inorganic particle to a length of diameter of the spherical organic particle is 3 to 5.

In one embodiment, the coating layer may be in direct contact with the electrode active material layer.

In one embodiment, the spherical organic particles may include at least one of polyimide resin particles; and resin particles including a unit represented by Formula 1 below:

[Formula 1]

(In Formula 1, R1 and R2 are each independently hydrogen, halogen, or a C1 to C6 alkyl group, and at least one of R1 and R2 is halogen).

In one embodiment, the spherical organic particle may have a sphericity of 0.8 to 1.

In one embodiment, the rod-shaped inorganic particle may have an aspect ratio of 6 to 8.

In one embodiment, the major axis of the rod-shaped inorganic particle may have a length of 0.3 to 10 μm.

In one embodiment, the rod-shaped inorganic particles may include boehmite particles.

In one embodiment, a ratio of a weight of the rod-shaped inorganic particles to a weight of the spherical organic particles in the coating layer may be 0.7 to 8.5.

In one embodiment, the polyimide resin particle may have a diameter of 0.1 to 2 μm.

In one embodiment, the polyimide resin particles may include polyamide-imide resin particles.

In one embodiment, the resin particles including the unit of Formula 1 may include resin particles including a repeating unit of Formula 2 below:

[Formula 2]

(In Formula 2, R1 to R4 are each independently hydrogen or a C1 to C6 alkyl group, R5 and R6 are each independently hydrogen, halogen or a C1 to C6 alkyl group, and at least one of R5 and R6 is halogen).

In one embodiment, the coating layer may further include a binder.

In one embodiment, the binder may include at least one of a rubber binder and a fluorine-based binder.

In one embodiment, the binder may include spherical binder particles, and a ratio of the length of major axis of the rod-shaped inorganic particle to the length of diameter of the spherical binder particle may be 3 to 5.

In one embodiment, the coating layer may include: 10 to 55% by weight of the spherical organic particles, 40 to 85% by weight of the rod-shaped inorganic particles, and 1 to 10% by weight of the binder.

In one embodiment, the air permeability of the coating layer, which is measured by Gurley method, may be 50 to 175 sec/100 cc.

In one embodiment, the coating layer may have a glass transition temperature of 270° C. or higher.

In one embodiment, the coating layer may have a thickness of 0.1 to 15 μm.

In one embodiment, the electrode current collector may be a cathode current collector, and the electrode active material layer may be a cathode active material layer including a lithium metal oxide, the lithium metal oxide may include 80 mol % or more of nickel based on a total number of moles of all elements except for lithium and oxygen, and the coating layer may further include a rubber binder.

In one embodiment, the electrode current collector may be an anode current collector, and the electrode active material layer may be an anode active material layer including at least one of a carbon-based anode active material and a silicon-based anode active material, and the coating layer may further include a fluorine-based binder.

According to an aspect of the present invention, there is provided a lithium secondary battery including: a cathode; and an anode disposed to face the cathode; wherein at least one of the cathode and the anode is the above-described electrode for a secondary battery.

In one embodiment, the electrode for a secondary battery may be provided as the anode, and the cathode may include a cathode active material layer, and the cathode active material layer may be in direct contact with the coating layer included in the anode.

In one embodiment, the electrode for a secondary battery may be provided as the cathode, and the anode may include an anode active material layer, and the anode active material layer may be in direct contact with the coating layer included in the cathode.

The secondary battery according to exemplary embodiments may not include a separate separation membrane including a polyolefin membrane as a substrate. Accordingly, the energy density of the secondary battery may be further improved.

In the secondary battery according to the exemplary embodiments, a coating layer that can replace the conventional separation membrane may be formed on the electrode. Accordingly, the energy density of the secondary battery may be improved.

In some embodiments, the coating layer may include spherical organic particles (e.g., polyimide particles and/or resin particles including a repeating unit of Formula 2 to be described below) and rod-shaped inorganic particles, thereby having excellent heat resistance. Accordingly, it is possible to implement a secondary battery having improved high temperature stability.

In some embodiments, a ratio of a length of diameter of the spherical organic particle to a length of major axis of the rod-shaped inorganic particle may be within a specific numerical range. Accordingly, the coating layer may have excellent air permeability. Therefore, it is possible to implement a secondary battery having improved operation stability.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

An electrode for a secondary battery according to exemplary embodiments may include: an electrode current collector; an electrode active material layer formed on the electrode current collector; and a coating layer formed on the electrode active material layer and including rod-shaped inorganic particles and spherical organic particles.

In one embodiment, a ratio of a length of major axis of the rod-shaped inorganic particle to a length of diameter of the spherical organic particle may be 3 to 5. In this case, the coating layer may have excellent air permeability, and a secondary battery having improved operation stability may be implemented.

A secondary battery according to exemplary embodiments may include the electrode. For example, the coating layer may replace a separation membrane including a polyolefin membrane. Accordingly, it is possible to further reduce a thickness of the secondary battery, and further improve an energy density of the secondary battery.

Hereinafter, an electrode for a secondary battery and a secondary battery including the same according to exemplary embodiments will be described in more detail with reference to the drawings.

Figure 1:
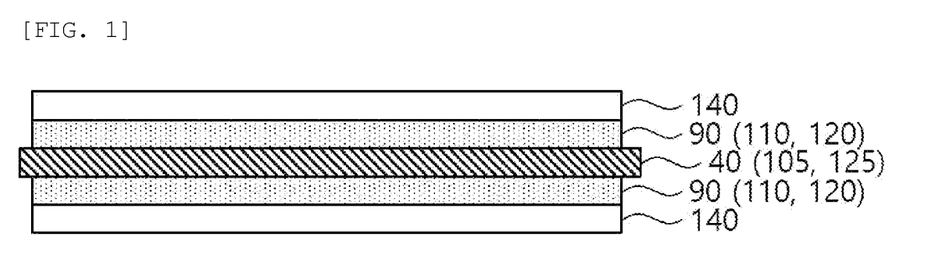
FIG. 1 is a schematic cross-sectional view illustrating an anode according to an exemplary embodiment.
Figure 2:
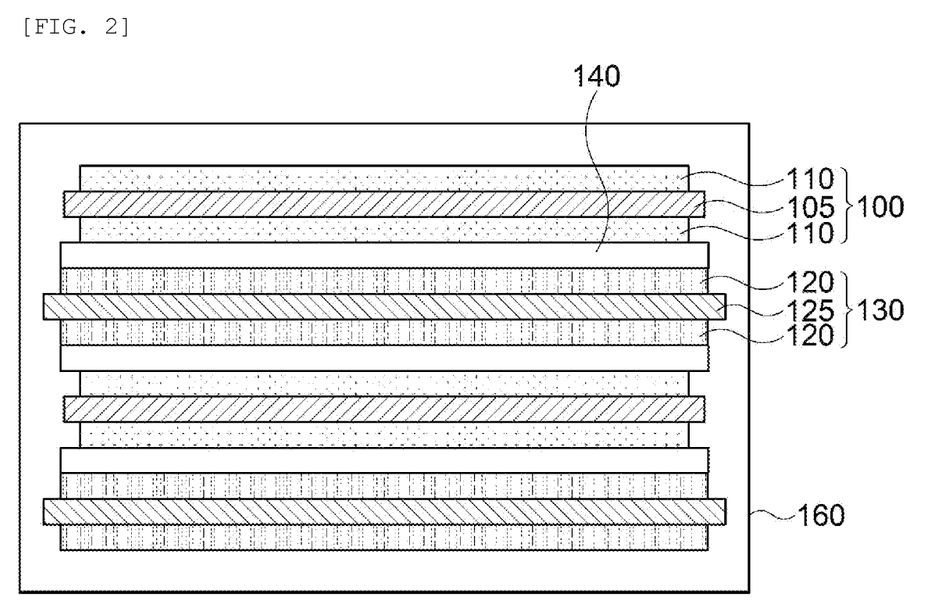
FIGS. 2 and 3 are a schematic cross-sectional view and a plan view of a lithium secondary battery according to an exemplary embodiment, respectively.
Figure 3:
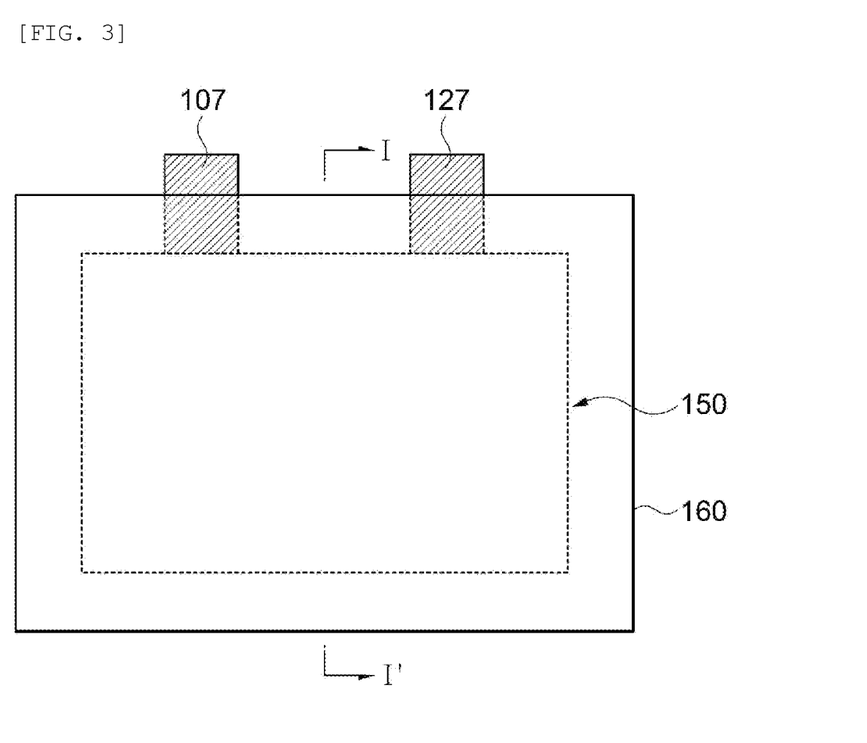

FIG. 1 is a schematic cross-sectional view illustrating an anode according to an exemplary embodiment; and FIGS. 2 and 3 are a schematic cross-sectional view and a plan view of a secondary battery according to an exemplary embodiment, respectively.

As shown in FIG. 1, an electrode for a secondary battery according to exemplary embodiments may include an electrode current collector 40; an electrode active material layer 90 formed on the electrode current collector 40; and a coating layer 140 formed on the electrode active material layer 90.

The electrode active material layer 90 may be formed on one surface, and may be formed on both surfaces (e.g., upper and lower surfaces) of the electrode current collector 40.

For example, the coating layer 140 may be formed to directly contact with the electrode active material layer 90. In this case, the energy density of the secondary battery may be further improved.

In one embodiment, the electrode for a secondary battery may be applied to an anode. For example, the electrode current collector 40 may be an anode current collector 125, and the electrode active material layer 90 may be an anode active material layer 120.

In one embodiment, the electrode for a secondary battery may be applied to a cathode. For example, the electrode current collector 40 may be a cathode current collector 105, and the electrode active material layer 90 may be a cathode active material layer 110.

In one embodiment, the coating layer 140 may include rod-shaped inorganic particles and spherical organic particles.

In one embodiment, a ratio of a length of major axis of the rod-shaped inorganic particle to a length of diameter of the spherical organic particle may be 3 to 5. In this case, the coating layer may have excellent air permeability, and a secondary battery having further improved operation stability may be implemented.

In one embodiment, the spherical organic particles may have a sphericity of 0.4 to 1.0, 0.5 to 1.0, 0.6 to 1.0, 0.7 to 1.0, 0.8 to 1.0, or 0.9 to 1.0. In this case, the spherical organic particles may be implement a coating layer having further improved air permeability in combination with the rod-shaped inorganic particles. In addition, a secondary battery having improved operation stability may be implemented.

For example, the rod-shaped inorganic particles may refer to inorganic particles having a shape having an aspect ratio other than 1, and may also include a fiber shape. For example, the aspect ratio may be defined as a length of major axis of the particle/a thickness of the particle (or a length of minor axis of the particle) (herein, the length of major axis of the particle>the thickness of the particle).

For example, a shape of a cross-section (e.g., a cross-section perpendicular to a direction of the major axis) of the rod-shaped inorganic particle is not particularly limited. For example, the cross-section of the rod-shaped inorganic particles may be a circular, an elliptical or a polygonal shape, etc., and the rod-shaped inorganic particles may be a cylindrical or a polygonal column shape, etc.

For example, the 'thickness' of the rod-shaped inorganic particles may mean an average length of the longest diameter and the shortest diameter among diameters of cross-sections perpendicular to the direction of the major axis of the particles. For example, when the cross-section of the particle is an elliptical shape, the length of diameter of the cross-section may mean an average length of the longest diameter and the shortest diameter of an ellipse, and when the cross-section thereof is polygonal shape, the length of diameter of the cross-section may mean a length of diameter of a circumscribed circle.

In one embodiment, the aspect ratio of the rod-shaped inorganic particle may be more than 1 and less than 50, and specifically, more than 1 and less than 25, 1.5 to 15, 2 to 10, or 6 to 8. In this case, the air permeability of the coating layer 140 may be further improved.

For example, the length of diameter of the spherical organic particle and the length of major axis of the rod-shaped inorganic particle may be measured on the basis of a scanning electron microscopy (SEM) image obtained by observing the surface or cross-section of the coating layer 140 with a scanning electron microscope (SEM).

For example, the ratio of the length of major axis of the rod-shaped inorganic particle to the length of diameter of the spherical organic particle may be defined as a ratio of lengths based on a two-dimensional SEM image.

For example, when the SEM image of the spherical organic particle is a circular shape, the length of diameter of the spherical organic particle may mean a length of diameter of a circle. When the SEM image of the spherical organic particle is an elliptical shape, the length of diameter may mean the average length of the longest diameter and the shortest diameter of the ellipse. When the SEM image of the spherical organic particle is a polygonal shape, the length of diameter may mean the length of diameter of the circumscribed circle.

In one embodiment, the spherical organic particle may have a diameter of 0.1 to 2 µm, preferably 0.25 to 1.5 µm, and more preferably, 0.5 to 1.25 µm. In this case, the coating layer 140 may exhibit excellent air permeability.

In one embodiment, the major axis of the rod-shaped inorganic particle may have a length of 0.1 to 15 µm, preferably, 0.3 to 10 µm, more preferably, 0.5 to 7.5 µm, and even more preferably, 1 to 6 µm. In this case, the air permeability of the coating layer 140 may be further improved.

In one embodiment, a ratio of a weight of the rod-shaped inorganic particle to a weight of the spherical organic particle in the coating layer 140 may be 0.5 to 12, preferably 0.7 to 8.5, more preferably 1 to 5.5, and even more preferably, 1 to 5.0.

In one embodiment, the rod-shaped inorganic particles may include at least one of MgO, $Mg(OH)_2$, $BaSO_3$, silica ($SiO_2$), bohemite and alumina ($Al_2O_2$).

In some embodiments, the rod-shaped inorganic particles may include boehmite particles.

In one embodiment, the spherical organic particles may include polyimide resin particles and/or resin particles including a unit represented by Formula 1 below. In this case, it is possible to implement a secondary battery having further improved high temperature stability.

[Formula 1]

In Formula 1, $R_1$ and $R_2$ may be each independently hydrogen, halogen, or a $C_1$ to $C_6$ alkyl group, and at least one of $R_1$ and $R_2$ may be halogen.

For example, the resin particles including the unit represented by Formula 1 may include the unit represented by Formula 1 in a main chain.

For example, the polyimide resin particles may mean a resin including an imide group in a repeating unit. For example, the polyimide resin particles may include an imide group in the main chain and/or a pendant group. For example, the polyimide resin particles may include an imide group in the main chain.

In some embodiments, the polyimide resin particles may include polyamide-imide resin particles. For example, the polyamide-imide resin particles may include an amide group and an imide group in a repeating unit. For example, the polyamide-imide resin particles may include an amide group and an imide group in the main chain. In this case, the coating layer 140 may exhibit better heat resistance.

In some embodiments, a weight average molecular weight (Mw) of the polyimide-based resin particles may be 5,000 to 100,000 g/mol, preferably 15,000 to 75,000 g/mol, more preferably 30,000 to 60,000 g/mol.

In some embodiments, the resin particles including the unit represented by Formula 1 may include a repeating unit represented by Formula 2 below. In this case, it is possible to implement a secondary battery having further improved high temperature stability.

[Formula 2]

In Formula 2, $R_1$ to $R_4$ may be each independently hydrogen or a $C_1$ to $C_6$ alkyl group, $R_5$ and $R_6$ may be each independently hydrogen, halogen or a $C_1$ to $C_6$ alkyl group, and at least one of $R_5$ and $R_6$ may be halogen.

In some embodiments, in Formula 2, $R_1$ to $R_4$ may be hydrogen, $R_5$ and $R_6$ may be each independently hydrogen or halogen, and at least one of $R_5$ and $R_6$ may be halogen.

In some embodiments, in Formula 2, $R_1$ to $R_4$ may be hydrogen, $R_5$ may be halogen, and $R_6$ may be hydrogen. In this case, it is possible to implement a secondary battery having further improved high temperature stability.

For example, the halogen may be one of F, Cl, Br and I. In some embodiments, the halogen may be F or Cl.

In some embodiments, a weight average molecular weight (Mw) of the resin particles including the unit represented by Formula 1 is 10,000 to 500,000 g/mol, 30,000 to 300,000 g/mol, 50,000 to 200,000 g/mol, or 70,000 to 150,000 g/mol.

In one embodiment, the coating layer 140 may further include a binder. In this case, an adhesive force between the coating layer 140 and the electrode active material layer 90 may be increased. In addition, for example, the adhesion force between the spherical organic particles and the rod-shaped inorganic particles in the coating layer 140 may be increased. Accordingly, operation stability of the secondary battery may be further improved.

In some embodiments, the binder may include at least one of a rubber binder (However, the resin particles including the unit represented by Formula 1 are excluded) and a fluorine-based binder. For example, the rubber binder may include styrene-butadiene rubber (SBR), and the fluorine-based binder may include polyvinylidene fluoride (PVDF), vinylidene fluoride-hexafluoropropylene copolymer (PVDF-co-HFP) and the like.

In one embodiment, when the electrode for a secondary battery is applied to the anode 130, the coating layer 140 may include the fluorine-based binder. In addition, the anode active material layer 120 may include the rubber binder.

In one embodiment, when the electrode for a secondary battery is applied to the cathode 110, the coating layer 140 may include the rubber binder. In addition, the cathode active material layer 110 may include the fluorine-based binder.

As described above, when the electrode active material layer and the coating layer include different binders from each other, dispersion media of a slurry for the electrode active material layer and a slurry for the coating layer may be different from each other during preparation of the electrode. Accordingly, it is possible to prevent the electrode active material layer from being deteriorated by the dispersion medium of the slurry for the coating layer.

In some embodiments, the binder may include spherical binder particles (e.g., spherical SBR particles).

In one embodiment, the spherical binder particles may have a sphericity of 0.4 to 1.0, 0.5 to 1.0, 0.6 to 1.0, 0.7 to 1.0, 0.8 to 1.0, or 0.9 to 1.0.

In some embodiments, the ratio of the length of major axis of the rod-shaped inorganic particle to the length of diameter of the spherical binder particle may be 3 to 5. In this case, the air permeability and the above-described adhesive force in the coating layer 140 may be further improved.

In some embodiments, the coating layer 140 may include 10 to 55% by weight ('wt. %') of the spherical organic particles, 40 to 85 wt. % of the rod-shaped inorganic particles, and 1 to 10 wt. % of the binder. Otherwise, the coating layer 140 may include 15 to 45 wt. % of the spherical organic particles, 50 to 88 wt. % of the rod-shaped inorganic particles, and 1 to 10 wt. % of the binder. In this case, the coating layer 140 may exhibit better air permeability, heat resistance and adhesive force.

In one embodiment, the air permeability of the coating layer 140 measured by the Gurley method may be 50 to 175 sec/100 cc. In this case, it is possible to implement a secondary battery having excellent high temperature stability and output stability. For example, as the air permeability of the coating layer 140 is decreased, thermal stability of the coating layer 140 may be deteriorated. In addition, as the air permeability of the coating layer 140 is increased, output characteristics of the secondary battery may be deteriorated. Therefore, when the coating layer 140 has the air permeability in the above-described range, it may be advantageous in implementing a secondary battery having excellent operation stability.

In one embodiment, the coating layer 140 may have a glass transition temperature of 200° C., preferably, 250° C., and more preferably, 270° C. or higher. In this case, the coating layer 140 may have excellent heat resistance, and the secondary battery may have further improved high temperature stability.

In one embodiment, the coating layer 140 may have a thickness of 0.1 to 15 μm, preferably, 1 to 10 μm, and more preferably, 2 to 8 μm. In this case, the energy density of the secondary battery may be further improved.

The electrode according to the above-described exemplary embodiments may be applied to at least one of the cathode and the anode of the lithium secondary battery.

In one embodiment, in order to improve the thickness and energy density of the battery, the above-described electrode may be applied to only one of the cathode and the anode.

Hereinafter, the lithium secondary battery according to exemplary embodiments will be described in more detail with reference to FIGS. 2 and 3. For the convenience of description, the case, in which the above-described electrode is applied to the anode, will be described as an example. However, as described above, the above-described electrode may be applied to the cathode, or may be applied to both the anode and the cathode.

Referring to FIG. 2, the lithium secondary battery may include a cathode 100 and an anode 130 disposed to face the cathode 100.

For example, the cathode 100 may include a cathode current collector 105 and a cathode active material layer 110 on the cathode current collector 105.

The cathode active material layer 110 may be formed on one surface or both surfaces (i.e., upper and lower surfaces) of the cathode current collector 105.

The cathode active material layer 110 may include a cathode active material, and if necessary, a cathode binder and a conductive material.

The cathode 100 may be prepared, for example, by mixing and stirring the cathode active material, the cathode binder, and the conductive material, etc. in the dispersion medium to prepare a cathode slurry, and then coating the cathode current collector 105 with the cathode slurry, followed by drying and rolling the same.

The cathode current collector 105 may include, for example, stainless steel, nickel, aluminum, titanium, copper, or an alloy thereof, and preferably, includes aluminum or an aluminum alloy.

The cathode active material may be a material capable of reversibly intercalating and deintercalating lithium ions. The cathode active material may be, for example, a lithium metal oxide including a metal element such as nickel, cobalt, manganese, aluminum and the like.

In one embodiment, the lithium metal oxide may include 80 mol % or more of nickel, preferably 85 mol % or more, and more preferably 90 mol % or more, based on a total number of moles of all elements except for lithium and oxygen.

In one embodiment, the lithium metal oxide may be represented by Formula 3 below.

$$Li_xNi_aCo_bM_cO_y \qquad \text{[Formula 3]}$$

In Formula 1, M may be at least one of Al, Zr, Ti, B, Mg, Mn, Ba, Si, Y, W, and Sr, and x, y, a, b and c may be in a range of $0.9 \le x \le 1.2$, $1.9 \le y \le 2.1$, $0.8 \le a \le 1$, $0 \le c/(a+b) \le 0.13$ and $0 \le c \le 0.11$, respectively.

In some embodiments, a may be in a range of $0.85 \le a \le 1$, and more preferably, $0.9 \le a \le 1$.

In some embodiments, Mc may be Mn or Al.

In some embodiments, the lithium metal oxide may further include a coating element or a doping element. For example, the coating element or the doping element may include Al, Ti, Ba, Zr, Si, B, Mg, P, Sr, W, La, or an alloy thereof, or an oxide thereof. These may be used alone or in combination of two or more.

The cathode binder may include, for example, an organic binder such as polyvinylidene fluoride (PVDF), vinylidene fluoride-hexafluoropropylene copolymer (PVDF-co-HFP), polyacrylonitrile, polymethyl methacrylate, etc., or an aqueous binder such as styrene-butadiene rubber (SBR). In addition, the cathode binder may be used together with a thickener such as carboxymethyl cellulose (CMC).

The conductive material may include, for example, a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125, an anode active material layer 120 on the anode current collector 125, and a coating layer 140 on the anode active material layer 120.

The anode active material layer 120 may be formed on one surface or both surfaces (i.e., upper and lower surfaces) of the anode current collector 125.

The anode active material layer 120 may include an anode active material, and if necessary, an anode binder and a conductive material.

The anode 130 may be prepared, for example, by mixing and stirring the anode active material, the anode binder and the conductive material, etc. in a solvent to prepare an anode slurry, and then coating the anode current collector 125 with the anode slurry, followed by drying and rolling the same.

The anode current collector 125 may include, for example, gold, stainless steel, nickel, aluminum, titanium, copper or an alloy thereof, and preferably, includes copper or a copper alloy.

The anode active material may be a material capable of reversibly intercalating and deintercalating lithium ions. The anode active material may include: for example, a carbon-based anode active material; a silicon-based anode active material; a lithium alloy and the like.

The carbon-based anode active material may include, for example, crystalline carbon, amorphous carbon, carbon composite material, carbon fiber and the like.

The amorphous carbon may be, for example, hard carbon, cokes, mesocarbon microbead (MCMB) calcined at 1500° C. or lower, mesophase pitch-based carbon fiber (MPCF) or the like. The crystalline carbon may be, for example, natural graphite, graphite cokes, graphite MCMB, graphite MPCF or the like.

The silicon material may include, for example, Si, $SiO_x$ ($0<x<2$), Si/C, SiO/C, Si-metal or the like.

The lithium alloy may include, for example, a metal element such as aluminum, zinc, bismuth, cadmium, antimony, silicon, lead, tin, gallium, indium or the like.

The anode binder and the conductive material may be substantially the same as or similar to the cathode binder and the conductive material. The anode binder may be, for example, an aqueous binder such as styrene-butadiene rubber (SBR) for consistency with the carbon-based active material, and may be used together with a thickener such as carboxymethyl cellulose (CMC).

A separation membrane (not illustrated) may be interposed between the cathode 100 and the anode 130.

The separation membrane may include a porous polymer film made of a polyolefin polymer such as ethylene homopolymer, propylene homopolymer, ethylene/butene copolymer, ethylene/hexene copolymer, ethylene/methacrylate copolymer or the like.

In one embodiment, the lithium secondary battery may not include a separate separation membrane between the cathode 100 and the anode 130.

In one embodiment, the lithium secondary battery may not include a polyolefin membrane between the cathode 100 and the anode 130.

For example, the above-described electrode for a secondary battery may be provided as the anode 130, and the coating layer 140 and the cathode active material layer 110 may directly contact with each other.

For example, the above-described electrode for a secondary battery may be provided as the cathode 100, and the coating layer 140 and the anode active material layer 120 may directly contact with each other.

In the lithium secondary battery according to exemplary embodiments, the coating layer 140 may serve as a separation membrane. Accordingly, since a separate separation membrane may not be included, the thickness and energy density of the secondary battery may be further improved.

An electrode cell may be formed by including the cathode 100 and the anode 130. In addition, a plurality of electrode cells may be laminated to form the electrode assembly 150.

Referring to FIG. 3, the lithium secondary battery may include: a cathode lead 107 connected to the cathode 100 and protruding to an outside of a case 160; and an anode lead 127 connected to the anode 130 and protruding to the outside of the case 160.

For example, the cathode 100 and the cathode lead 107 may be electrically connected with each other. Similarly, the anode 130 and the anode lead 127 may be electrically connected with each other.

For example, the cathode lead 107 may be electrically connected to the cathode current collector 105. In addition, the anode lead 127 may be electrically connected to the anode current collector 125.

For example, the cathode current collector 105 may include a protrusion part (cathode tab, not illustrated) on one side. The cathode active material layer 110 may not be formed on the cathode tab. The cathode tab may be formed integrally with the cathode current collector 105 or may be connected thereto by welding or the like. The cathode current collector 105 and the cathode lead 107 may be electrically connected with each other through the cathode tab.

Similarly, the anode current collector 125 may include a protrusion part (anode tab, not illustrated) on one side. The anode active material layer 120 may not be formed on the anode tab. The anode tab may be formed integrally with the anode current collector 125 or may be connected thereto by welding or the like. The anode current collector 125 and the anode lead 127 may be electrically connected with each other through the anode tab.

In one embodiment, the electrode assembly 150 may include a plurality of cathodes and a plurality of anodes. For example, the plurality of cathodes and anodes may be disposed alternately with each other. Accordingly, the lithium secondary battery may include a plurality of cathode tabs and a plurality of anode tabs protruding from each of the plurality of cathodes and the plurality of anodes.

In one embodiment, the cathode tabs (or, the anode tabs) may be laminated, compressed, and welded to form a cathode tab laminate (or, an anode tab laminate). The cathode tab laminate may be electrically connected to the cathode lead 107. In addition, the anode tab laminate may be electrically connected to the anode lead 127.

The electrode assembly 150 may be housed in the case 160 together with the electrolyte to form a lithium secondary battery.

The electrolyte may include, for example, a lithium salt, and the lithium salt may be housed in the case in a non-aqueous electrolyte state together with an organic solvent.

The lithium salt may be represented by, for example, $Li^+X^-$.

An anion ($X^-$) of the lithium salt may be, for example, any one selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. In some embodiments, the lithium salt may include at least one of $LiBF_4$ and $LiPF_6$.

The organic solvent may include, for example, any one or more selected from ethylene carbonate (EC), propylene carbonate (PC), dimethyl carbonate (DMC), diethyl carbonate (DEC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane and the like.

The lithium secondary battery may be manufactured, for example, in a cylindrical shape, a square shape, a pouch shape or a coin shape.

Hereinafter, preferred examples and comparative examples of the present invention will be described. However, the following examples are only preferred examples of the present invention, and the present invention is not limited thereto.

EXAMPLES AND COMPARATIVE EXAMPLES USING PI PARTICLES AS SPHERICAL ORGANIC PARTICLES

Example 1

1. Preparation of Slurry for Forming Cathode Coating Layer

Polyimide resin particles (sphericity>0.9, weight average molecular weight 45,000 g/mol, hereinafter, referred to as PI particles) and boehmite particles (hereinafter, referred to as BM particles) were prepared, and then classified depending on the diameter and major axis, respectively.

PI particles (diameter: 0.5 μm), BM particles (major axis: 1.9 μm, and aspect ratio: 7), SBR particles and carboxymethyl cellulose (CMC) were dispersed in distilled water in a weight ratio of 35:60:3.5:1.5 to prepare a slurry for forming a cathode coating layer.

2. Preparation of Cathode and Anode (1) Preparation of Cathode with Coating Layer Formed Thereon $Li(Ni_{0.8}Co_{0.1}Mn_{0.1})O_2$ as a cathode active material, carbon black and PVDF were dispersed in NMP in a weight ratio of 92:5:3 to prepare a cathode slurry.

The cathode slurry was applied to a region except for a protrusion part of an aluminum foil having the protrusion part on one side (thickness: 15 μm), followed by drying and rolling to form a cathode active material layer.

The slurry for forming the cathode coating layer was applied to the cathode active material layer, followed by drying and rolling to prepare a cathode of Example 1, on which a coating layer (thickness: 5 μm) was formed.

(2) Preparation of Anode

An anode active material in which artificial graphite and natural graphite were mixed in a weight ratio of 7:3, SBR and CMC were dispersed in distilled water in a weight ratio of 97:1:2 to prepare an anode slurry.

The anode slurry was applied to a region except for a protrusion part of a copper foil having the protrusion part on one side (thickness: 15 μm), followed by drying and rolling to prepare an anode of Example 1.

3. Preparation of Lithium Secondary Battery Samples

The cathode and the anode were laminated to form an electrode assembly.

A cathode lead and an anode lead were welded and connected to the protrusion part (cathode tab) of the cathode and the protrusion part (anode tab) of the anode, respectively.

The electrode assembly was housed in a pouch (case) so that some regions of the cathode lead and the anode lead were exposed to an outside of the pouch, followed by sealing three sides of the pouch except for a side of an electrolyte injection part.

After injecting the electrolyte and sealing the electrolyte injection part, a lithium secondary battery sample was prepared by impregnation for 12 hours.

The electrolyte used herein was prepared by dissolving 1M $LiPF_6$ solution (a mixed solvent of EC/EMC/DEC in a volume ratio of 25:30:45), and adding and mixing 1 wt. % of fluoroethylene carbonate (FEC), 0.3 wt. % of vinylethylene carbonate (VC), 1.0 wt. % of lithium difluorophosphate (LiPO2F2), 0.5 wt. % of 1,3-propane sultone (PS), and 0.5 wt. % of prop-1-ene-1,3-sultone (PRS) based on the total weight of the electrolyte.

Example 2

A lithium secondary battery was prepared by performing the same procedures as described in Example 1, except that the ratio of the length of major axis of the BM particles to the length of diameter of the PI particles was changed as shown in Table 1 below.

An application amount and rolling strength of the slurry for forming the cathode coating layer were maintained the same, and the thickness of the coating layer was also changed according to the change in the ratio of the length of major axis of the BM particles to the length of diameter of the PI particles.

Examples 3 to 6

Lithium secondary batteries were prepared by performing the same procedures as described in Example 1, except that the mixing weight ratios of the PI particles and the BM particles were changed as shown in Table 1 below.

The application amount and rolling strength of the slurry for forming the cathode coating layer were maintained the same, and the thickness of the coating layer was also changed according to the change in the mixing weight ratio of the PI particles and the BM particles.

Example 7

The PI particles, the BM particles and PVDF were dispersed in NMP in a weight ratio of 35:60:5 to prepare a slurry for forming an anode coating layer.

The slurry for forming the anode coating layer was applied to the anode active material layer, followed by drying and rolling to prepare an anode of Example 7, on which a coating layer (thickness: 5 μm) was formed.

The anode of Example 7 was used instead of the anode of Example 1, and the cathode without the coating layer was used.

A lithium secondary battery was prepared by performing the same procedures as described in Example 1, except for the above description.

Comparative Example 1

A cathode without the coating layer was used instead of the cathode of Example 1.

An electrode assembly was formed by interposing a PE separation membrane (thickness: 18 μm) between the cathode and the anode.

A lithium secondary battery was prepared by performing the same procedures as described in Example 1, except for the above description.

Comparative Example 2

A cathode without the coating layer was used instead of the cathode of Example 1.

The slurry for forming the cathode coating layer of Example 1 was applied to a PE separation membrane (thickness: 13 μm), followed by drying and rolling to prepare a coating layer (thickness: 5 μm).

An electrode assembly was formed by interposing a PE separation membrane on which the coating layer was formed between the cathode and the anode.

A lithium secondary battery was prepared by performing the same procedures as described in Example 1, except for the above description.

Comparative Examples 3 and 4

Lithium secondary batteries were prepared by performing the same procedures as described in Example 1, except that the ratios of the length of major axis of the BM particles to the length of diameter of the PI particles were changed as shown in Table 1 below.

The application amount and rolling strength of the slurry for forming the cathode coating layer were maintained the same, and the thickness of the coating layer was also changed according to the change in the ratio of the length of major axis of the BM particles to the length of diameter of the PI particles.

Examples Using CR Particles as Spherical Organic Particles

Example 8

Chloroprene rubber particles (sphericity>0.9, weight average molecular weight 120,000 g/mol, hereinafter, CR particles) and boehmite particles (hereinafter, BM particles) were prepared, and then classified depending on the diameter and major axis, respectively.

CR particles (diameter: 1.5 μm), BM particles (major axis: 5.7 μm, and aspect ratio: 7), SBR particles and carboxymethyl cellulose (CMC) were dispersed in distilled water in a weight ratio of 35:60:3.5:1.5 to prepare a slurry for forming a cathode coating layer.

A lithium secondary battery was prepared by performing the same procedures as described in Example 1, except for the above description.

Examples 9 to 11

Lithium secondary batteries were prepared by performing the same procedures as described in Example 8, except that the ratios of the length of major axis of the BM particles to the length of diameter of the CR particles were changed as shown in Table 2 below.

The application amount and rolling strength of the slurry for forming the cathode coating layer were maintained the same, and the thickness of the coating layer was also changed according to the change in the ratio of the length of major axis of the BM particles to the length of diameter of the CR particles.

Examples 12 to 15

Lithium secondary batteries were prepared by performing the same procedures as described in Example 8, except that the mixing weight ratios of the CR particles and the BM particles were changed as shown in Table 2 below.

The application amount and rolling strength of the slurry for forming the cathode coating layer were maintained the same, and the thickness of the coating layer was also changed according to the change in the mixing weight ratio of the CR particles and the BM particles.

Example 16

The CR particles, the BM particles and PVDF were dispersed in NMP in a weight ratio of 35:60:5 to prepare a slurry for forming an anode coating layer.

The slurry for forming the anode coating layer was applied to the anode active material layer, followed by drying and rolling to prepare an anode of Example 16, on which a coating layer (thickness: 5 μm) was formed.

The anode of Example 16 was used instead of the anode of Example 8, and the cathode without the coating layer was used.

A lithium secondary battery was prepared by performing the same procedures as described in Example 8, except for the above description.

Experimental Example 1: Measurement of Ratio of Length of Major Axis of BM Particle to Length of Diameter of PI Particle (or CR Particle)

Cross-sections of the coating layers of the examples and Comparative Examples 2 to 4 were observed by using a scanning electron microscope (SEM).

After obtaining SEM images of three regions at different positions in the cross-section of the coating layer, an average value A of the lengths of diameters of the PI particles (or CR particles) and an average value B of the lengths of major axes of the BM particles were measured.

A ratio (B/A) value of the length of major axis of the BM particle to the length of diameter of the PI particle (or CR particle) was calculated using the measured values A and B.

Experimental Example 2: Evaluation of Air Permeability

The slurries for forming the cathode (or anode) coating layer according to the examples and Comparative Examples 3 and 4 were applied to a glass plate, respectively, followed by drying and rolling to form coating layers having the same thickness.

The coating layers were peeled off from the glass plate to prepare coating layer samples. For the coating layer samples and the separation membranes of Comparative Examples 1 and 2 (the thicknesses of the coating layers are the same), air permeability was measured (in Gurley method).

The air permeability was measured using a Gurley densometer according to ASTM D726. More specifically, a time taken for 100 cc of air to pass through the cross-section of the coating layer sample under a pressure of 12.2 in $H_2O$ was measured.

Experimental Example 3-1: Evaluation of Operation Stability

The lithium secondary battery samples of Examples 1 to 7 and Comparative Examples were charged (CC/CV, 0.5 C 4.3 V, 0.05 C CUT-OFF) and discharged (CC, 1.0 C, 3.0 V CUT-OFF).

The charging and discharging were repeated 300 times at room temperature (25° C.)

During performing charging and discharging 300 times, it was confirmed whether the operation was interrupted due to a problem such as a short circuit, and evaluated according to the following criteria.

If an interruption of operation occurred: ×

When charging and discharging 300 times was performed without any problem: ○

Experimental Example 3-2: Evaluation of Operation Stability

The lithium secondary battery samples of Examples 8 to were charged (CC/CV, 0.5 C 4.3 V, 0.05 C CUT-OFF) and discharged (CC, 1.0 C, 3.0 V CUT-OFF).

The charging and discharging were repeated 200 times at room temperature (25° C.)

During performing charging and discharging 200 times, it was confirmed whether the operation was interrupted due to a problem such as a short circuit, and evaluated according to the following criteria.

If an interruption of operation occurred: ×

When charging and discharging 200 times was performed without any problem: ○

Experimental Example 4: Evaluation of Expected Energy Density of Large Cells

Expected energy density values were calculated when the electrode assemblies of the examples and the comparative examples were laminated 77 times as a unit cell.

Based on the expected energy density value of Comparative Example 1, energy density increase/decrease values of the examples and Comparative Examples 2 to 4 were calculated.

The energy density increase/decrease value was calculated as the following formula.

The following formula is defined using Example 1 as an example.

Energy density increase/decrease value (%)=[(Expected energy density of Example 1−Expected energy density of Comparative Example 1)/Expected energy density of Comparative Example 1]×100(%).

TABLE 1

| | Content of PI particles (wt. %) | Content of BM particles (wt. %) | Weight ratio of BM particles to PI particles | B/A value (ratio of length) | Air permeability (sec/100 cc) | Energy density increase/ decrease value (%) | Operation stability |
|---|---|---|---|---|---|---|---|
| Example 1 | 35 | 60 | 1.71 | 3.8 | 102 | 8 | ○ |
| Example 2 | 35 | 60 | 1.71 | 4.3 | 104 | 8 | ○ |
| Example 3 | 15 | 80 | 5.34 | 3.8 | 148 | 2 | ○ |
| Example 4 | 50 | 45 | 0.90 | 3.8 | 57 | 4 | ○ |
| Example 5 | 7.5 | 87.5 | 11.67 | 3.8 | 180 | 0.5 | ○ |
| Example 6 | 60 | 35 | 0.58 | 3.8 | 48 | 3 | ○ |
| Example 7 | 35 | 60 | 1.71 | 3.8 | 113 | 8 | ○ |
| Comparative Example 1 | — | — | — | — | 110 | — | ○ |
| Comparative Example 2 | 35 | 60 | 1.71 | 3.8 | 158 | −6 | ○ |
| Comparative Example 3 | 35 | 60 | 1.71 | 2.9 | Over 200 | −2 | ○ |
| Comparative Example 4 | 35 | 60 | 1.71 | 5.2 | 35 | — | × |

TABLE 1

|  | Content of CR particles (wt. %) | Content of BM particles (wt. %) | Weight ratio of BM particles to CR particles | B/A value (ratio of length) | Air permeability (sec/100 cc) | Energy density increase/ decrease value (%) | Operation stability |
|---|---|---|---|---|---|---|---|
| Example 8 | 35 | 60 | 1.71 | 3.8 | 101 | 8 | ○ |
| Example 9 | 35 | 60 | 1.71 | 4.3 | 103 | 8 | ○ |
| Example 10 | 35 | 60 | 1.71 | 2.9 | 190 | 0.5 | ○ |
| Example 11 | 35 | 60 | 1.71 | 5.2 | 39 | 4 | ○ |
| Example 12 | 15 | 80 | 5.34 | 3.8 | 157 | 1.5 | ○ |
| Example 13 | 50 | 45 | 0.90 | 3.8 | 66 | 3 | ○ |
| Example 14 | 7.5 | 87.5 | 11.67 | 3.8 | 178 | 1 | ○ |
| Example 15 | 60 | 35 | 0.58 | 3.8 | 49 | 3 | ○ |
| Example 16 | 35 | 60 | 1.71 | 3.8 | 111 | 8 | ○ |

Referring to Tables 1 and 2, in the case of the secondary batteries of the examples, the operation stability and energy density increase/decrease values were excellent.

In the case of the secondary battery of Comparative Example 2, by employing a separate PE substrate and forming a coating layer on the PE substrate, energy density was rather reduced.

In the case of the secondary battery of Comparative Example 4, a problem entailed in operation stability was observed. It seems to be because the thickness of the coating layer in Comparative Example 4 is thinner than in other examples and comparative examples due to a difference in B/A value (the total weights of PI particles and BM particles in the coating layer are the same, such that the thickness may be different according to the B/A value or content ratio). Therefore, in the case of Comparative Example 4, the thickness of the coating layer should be increased in order to secure operation stability. However, in this case, there is a problem in that the energy density is reduced.

In the case of the secondary battery of Comparative Example 3, the thickness of the coating layer was increased due to the difference in the B/A value, thereby exhibiting the deteriorated value in the energy density.

What is claimed is:

1. An electrode for a secondary battery comprising:
   an electrode current collector;
   an electrode active material layer formed on the electrode current collector; and
   a coating layer formed on the electrode active material layer, and wherein the coating layer comprising rod-shaped inorganic particles,
   wherein the rod-shaped inorganic particles have an aspect ratio other than 1, and the aspect ratio is defined as a length of major axis of the particle/a length of minor axis of the particle,
   wherein a ratio of a length of major axis of the rod-shaped inorganic particle to a length of diameter of the spherical organic particle is 3 to 5.

2. The electrode for a secondary battery according to claim 1, wherein the coating layer is in direct contact with the electrode active material layer.

3. The electrode for a secondary battery according to claim 1, wherein the spherical organic particles include at least one of polyimide resin particles and resin particles comprising a unit represented by Formula 1 below:

[Formula 1]

(In Formula 1, $R_1$ and $R_2$ are each independently hydrogen, halogen, or a $C_1$ to $C_6$ alkyl group, and at least one of $R_1$ and $R_2$ is halogen).

4. The electrode for a secondary battery according to claim 1, wherein the spherical organic particle has a sphericity of 0.8 to 1.

5. The electrode for a secondary battery according to claim 1, wherein the rod-shaped inorganic particle has an aspect ratio of 6 to 8.

6. The electrode for a secondary battery according to claim 1, wherein the major axis of the rod-shaped inorganic particle has a length of 0.3 to 10 μm.

7. The electrode for a secondary battery according to claim 1, wherein the rod-shaped inorganic particles include boehmite particles.

8. The electrode for a secondary battery according to claim 1, wherein a ratio of a weight of the rod-shaped inorganic particles to a weight of the spherical organic particles in the coating layer is 0.7 to 8.5.

9. The electrode for a secondary battery according to claim 3, wherein the polyimide resin particle has a diameter of 0.1 to 2 μm.

10. The electrode for a secondary battery according to claim 3, wherein the polyimide resin particles include polyamide-imide resin particles.

11. The electrode for a secondary battery according to claim 3, wherein the resin particles comprising the unit of Formula 1 include resin particles comprising a repeating unit of Formula 2 below:

[Formula 2]

(In Formula 2, $R_1$ to $R_4$ are each independently hydrogen or a $C_1$ to $C_6$ alkyl group, $R_5$ and $R_6$ are each independently hydrogen, halogen or a $C_1$ to $C_6$ alkyl group, and at least one of $R_5$ and $R_6$ is halogen).

12. The electrode for a secondary battery according to claim 1, wherein the coating layer further comprises a binder.

13. The electrode for a secondary battery according to claim 12, wherein the binder includes at least one of a rubber binder and a fluorine-based binder.

14. The electrode for a secondary battery according to claim 12, wherein the binder comprises spherical binder particles, and a ratio of the length of major axis of the rod-shaped inorganic particle to the length of diameter of the spherical binder particle is 3 to 5.

15. The electrode for a secondary battery according to claim 12, wherein the coating layer comprises:
10 to 55% by weight of the spherical organic particles,
40 to 85% by weight of the rod-shaped inorganic particles, and
1 to 10% by weight of the binder.

16. The electrode for a secondary battery according to claim 1, wherein an air permeability of the coating layer, which is measured by Gurley method, is 50 to 175 sec/100 cc.

17. The electrode for a secondary battery according to claim 1, wherein the coating layer has a glass transition temperature of 270° C. or higher.

18. The electrode for a secondary battery according to claim 1, wherein the coating layer has a thickness of 0.1 to 15 μm.

19. The electrode for a secondary battery according to claim 1, wherein the electrode current collector is a cathode current collector, and the electrode active material layer is a cathode active material layer comprising a lithium metal oxide,
the lithium metal oxide includes 80 mol % or more of nickel based on a total number of moles of all elements except for lithium and oxygen, and
the coating layer further comprises a rubber binder.

20. The electrode for a secondary battery according to claim 1, wherein the electrode current collector is an anode current collector, and the electrode active material layer is an anode active material layer comprising at least one of a carbon-based anode active material and a silicon-based anode active material, and
the coating layer further comprises a fluorine-based binder.

21. A lithium secondary battery comprising:
a cathode; and
an anode disposed to face the cathode;
wherein at least one of the cathode and the anode is the electrode for a secondary battery according to claim 1.

22. The lithium secondary battery according to claim 21, wherein the electrode for a secondary battery is provided as the anode, and
the cathode comprises a cathode active material layer, and the cathode active material layer is in direct contact with the coating layer included in the anode.

23. The lithium secondary battery according to claim 21, wherein the electrode for a secondary battery is provided as the cathode, and
the anode comprises an anode active material layer, and the anode active material layer is in direct contact with the coating layer included in the cathode.

* * * * *